United States Patent [19]
Zeyen et al.

[11] Patent Number: 5,929,543
[45] Date of Patent: Jul. 27, 1999

[54] ELECTRIC MACHINE HAVING A COOLING JACKET

[75] Inventors: Klaus-Peter Zeyen, Köln; Thomas Pels, Heiden, both of Germany

[73] Assignee: ISAD Electronic Systems GmbH & Co. KG, Köln, Germany

[21] Appl. No.: 08/929,915

[22] Filed: Sep. 15, 1997

[30] Foreign Application Priority Data

Sep. 16, 1996 [DE] Germany .............. 196 37 671

[51] Int. Cl.$^6$ .............. H02K 9/19; H02K 9/00; H02K 9/193
[52] U.S. Cl. .............................. 310/54; 310/52
[58] Field of Search .................... 310/52, 54, 58, 310/59, 64, 89; 165/169, 170

[56] References Cited

U.S. PATENT DOCUMENTS

| | | | |
|---|---|---|---|
| 4,213,498 | 7/1980 | Vandenbossche | 165/136 |
| 4,971,144 | 11/1990 | Gibson et al. | 165/170 |
| 5,798,586 | 8/1998 | Adachi | 310/54 |

FOREIGN PATENT DOCUMENTS

| | | |
|---|---|---|
| 2124463 | 12/1971 | Germany . |
| 2331493 | 1/1974 | Germany . |
| 3545665 | 7/1987 | Germany . |
| 4020416 | 1/1992 | Germany . |
| 3-3633 | 1/1991 | Japan . |

*Primary Examiner*—Clayton LaBalle
*Attorney, Agent, or Firm*—Walter Ottesen

[57] ABSTRACT

The invention is directed to a cooling system for a electric machine. A reliable tightness with respect to the coolant to be used is ensured with respect to the machine to be cooled as well as with respect to the ambient. The cooling arrangement is convenient and does not constitute a hindrance in the event that repair or maintenance work must be conducted on the machine. The electric machine includes a stator and a cooling jacket defining a hollow interior and having an inlet opening and an outlet opening for connecting the cooling jacket to an external cooling circulating system for facilitating a flow of coolant through the interior. The cooling jacket has a hose-like configuration and is made of a flexible, elastic material so as to cause the cooling jacket to lie in close intimate contact with the stator to facilitate a transfer of heat from the stator to the coolant. The cooling jacket is made of rubber or silicone.

9 Claims, 1 Drawing Sheet

ELECTRIC MACHINE HAVING A COOLING JACKET

FIELD OF THE INVENTION

The invention relates to an electric machine having a cooling jacket through which a coolant flows.

BACKGROUND OF THE INVENTION

Electric machines must be cooled in order to provide the following: controlling the thermal load, maintaining adequate material strength, and avoiding the expansion of components which is too great and the problem of thermal stresses associated therewith.

Electric motors have been suggested which are equipped with stators having a plurality of cooling channels passing therethrough. Such configurations are expensive. Other suggestions are based on liquid cooling within the armature shaft. As a rule, this requires external coolant pumps. For this reason, an impeller pump for the purpose of driving a coolant is mounted in the hollow armature shaft, for example, as disclosed in German Patent 4,020,416.

International Class H 02 K 9/19 includes cooling and ventilating systems for machines having a closed housing and with a closed circulating system connected thereto. The closed circulating system utilizes a liquid coolant.

German patent publication 2,124,463, for example, discloses a hermetically closed electric motor which is located in a cylindrical compartment having an inlet opening and an outlet opening for the coolant.

The electric motor disclosed in German patent publication 2,331,493 includes a closed housing which is surrounded by an annular chamber through which coolant flows.

The subject matter of German Patent 3,545,665 likewise discloses a liquid-cooled electric motor having a pot-shaped housing over which a pot-shaped casing is mounted. The casing includes an inlet and an outlet for a coolant liquid which circulates between the housing and the casing.

A problem in such electric motors which has not yet been solved is especially that the tightness can only be achieved with difficulty for temperature fluctuations which are to be dealt with. The electric motor is built into a closed compartment and, additionally for this reason, the electric motor is accessible for maintenance and repair work only after a complete disassembly of the cooling chamber.

Overall, the known cooling chambers are complex and are therefore expensive with respect to their manufacture.

Japanese patent publication 64/136002 describes a cooling vessel which is made of a material having good heat conducting capability such as metal. As shown in the drawing, the cooling vessel has a hollow-cylindrical configuration so that it can be pushed over a motor which is correspondingly configured to be hollow cylindrical.

The metal used is usually hardly flexible and therefore is not suited to assume an intimate contact with various different forms. The cooling cylinder in this publication is possibly somewhat resilient because it is a hollow cylinder having longitudinal slits. The combination of longitudinal slits and spring action is however not suitable to be in close intimate contact with complicatedly configured forms having projections and the like.

The cooling arrangement disclosed in U.S. Pat. No. 4,213,498 is a simple flexible and only slightly expandable heat exchanger made of plastic. Liquid flows through the heat exchanger which is configured so that it conforms to the outer cylindrical surface of tanks or the like.

U.S. Pat. No. 4,971,144 is directed to a cooling wrap. The cooling wrap disclosed in both United States patents includes an upper layer and a lower layer and a channel system disposed therebetween. The distance between the upper and lower layers is fixed by this channel system.

The heat exchanger of U.S. Pat. No. 4,213,498 is made of plastic such as polypropylene or polyethylene. The heat exchanger is flexible but the plastic material is only slightly expandable. Because of the slight expandability of the materials and because of the configuration of the heat exchanger with a constant spacing between lower and upper layers, the heat exchanger is only suitable for cylindrically-shaped surfaces such as vessels and tanks. Semicircular or other surfaces having reliefs cannot be in intimate contact over the entire surface thereof with exchangers of this type.

SUMMARY OF THE INVENTION

It is an object of the invention to provide a cooling arrangement for an electric machine which can be produced both simply and cost effectively. A reliable tightness with respect to the coolant to be used is ensured with respect to the machine to be cooled as well as to the ambient. The cooling arrangement furthermore does not constitute a hindrance in the event repair work or maintenance work on the machine must be carried out.

The electric machine of the invention includes: a stator; a cooling jacket defining a hollow interior and having an inlet opening and an outlet opening for connecting the cooling jacket to an external cooling circulating system for facilitating a flow of coolant through the interior; and, the cooling jacket having a hose-like configuration and being made of a flexible, elastic material so as to cause the cooling jacket to lie in close intimate contact with the stator to facilitate a transfer of heat from the stator to the coolant.

According to a feature of the invention, the cooling jacket is made of a flexible material and lies in intimate contact with structure to which it is applied. The cooling jacket has a hose-like shape or a sack-like shape and liquid flows through the cooling jacket. The cooling jacket of the invention is made of rubber and silicone and is therefore not only flexible but is also expandable to a considerable extent. For this reason, the cooling jacket can be in intimate contact with the most differently configured surfaces. This adaptability to the most varied surface configurations is still further facilitated because the upper and lower jacket layers of the cooling jacket of the invention are not fixedly connected to each other. In this way, only the jacket surface, which faces the body to be cooled, needs to adapt to the particular surface configuration. In this way, a good heat transfer is ensured. Because of its flexibility, assembly and disassembly is simple, for example, when a machine has to be repaired.

In rigid cooling jackets, tightness problems occur because of the different thermal expansions of the different materials of the individual components. However, with the cooling jacket of the invention, these problems do not occur. The flexible cooling sack yields and adapts to the thermal expansion of different materials of the machine to be cooled. Thus, and in contrast to rigid cooling jackets, no apparent tightness (sealing) problems occur with the flexible cooling jacket of the invention, especially with respect to the electric machine.

The inlet and outlet openings (or hose ends) are preferably vulcanized to the remainder of the cooling jacket. Conducting the coolant to a heat exchanger at a remote location is therefore possible without difficulty. Especially for use in a motor vehicle, a connection of the cooling jacket of the invention to the cooling system of the internal combustion engine is possible.

The flexible hose-shaped configuration can be configured so as to be without pressure or be stable under pressure. If the flexible configuration is to be stable with respect to pressure, then a reinforcing fabric can be embedded in the wall of the cooling jacket made of rubber or silicone. In this way, a firm seating on the electric machine to be cooled and therefore an especially reliable heat transfer is achieved when the flexible cooling sack is subjected to pressure.

When utilizing a vaporizing coolant, a further intensive transfer of heat is achieved when the cooling circulating system is connected to a condenser system.

BRIEF DESCRIPTION OF THE INVENTION

The invention will now be explained with reference to the drawings wherein:

FIG. 1 shows a detail of an electric machine in longitudinal section with the electric machine being equipped with a cooling jacket in accordance with an embodiment of the invention; and, FIG. 2 is a schematic showing the cooling jacket connected to a condenser in accordance with another embodiment of the invention.

DESCRIPTION OF THE PREFERRED EMBODIMENTS OF THE INVENTION

Figure 1:
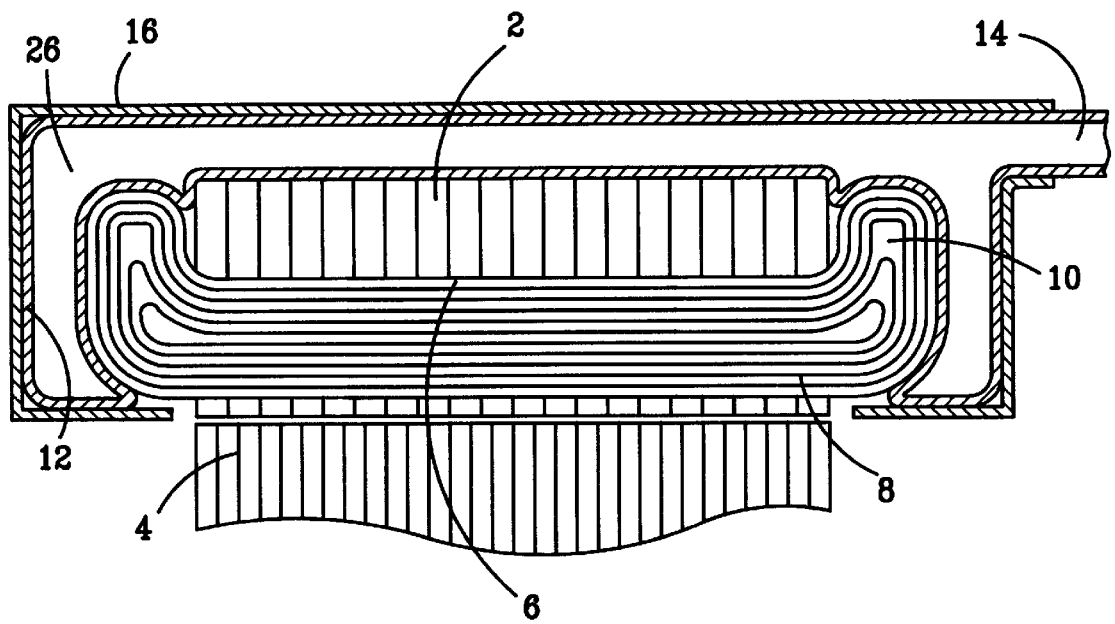

Referring to FIG. 1, reference numeral 2 identifies the stator lamination pack of the stator of the electric machine. The rotor or, more specifically, the rotor lamination pack, is identified by reference numeral 4. The stator lamination pack 2 has slots 6 and is provided with windings 8. At the end of the stator 2, the coil ends 10 project beyond the stator lamination pack 2.

A flexible hose-shaped body (cooling sack) 12 is pushed over the stator 2 of such a conventional electric machine. This cooling sack 12 is in intimate contact engagement with the stator as shown and includes inlet and outlet openings (15, 14) and is connected to a cooling circulating system as shown in FIG. 2.

Figure 2:
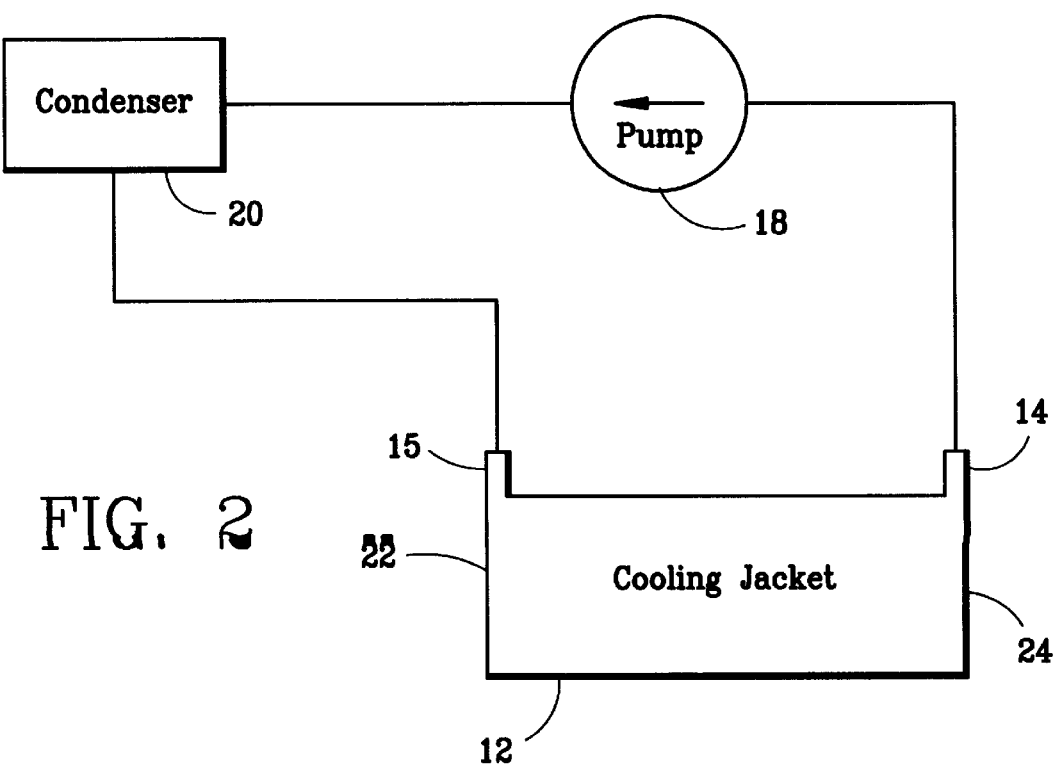

As shown in FIG. 2, a pump 18 pumps the coolant to the condenser 20 from where the coolant flows into inlet stub 15 of the cooling jacket 12. The coolant flows through the entire cooling jacket and exits at outlet stub 14 from where it is pumped back to the condenser. Inlet stub 15 is formed at one far end of the cooling jacket while the outlet stub 14 is formed at the other far end of the cooling jacket. In this way, the coolant flows through the entire cooling jacket 12. The cooling jacket can be configured and mounted on the stator so as to extend around the entire periphery thereof so that the two end walls 22 and 24 are mutually adjacent or abut each other.

The cooling sack 12 is made of a flexible material such as rubber or silicone and the interior 26 thereof is a clear interior devoid of any supports which fixedly join the top wall to the bottom wall. The bottom wall is shown here in intimate contact engagement with the stator 2. In this way, only the jacket surface, which is in contact with the stator to be cooled, needs the adapt to the particular surface configuration.

The flexible cooling sack 12 is configured so as to be stable with respect to pressure in order to obtain an especially good transfer of heat.

According to still another feature of the invention, a pressure-stiff housing 16 mounted over the flexible hose 12 ensures an intimate contact engagement and therefore a good heat transfer from the stator 2 to the cooling jacket 12.

It is understood that the foregoing description is that of the preferred embodiments of the invention and that various changes and modifications may be made thereto without departing from the spirit and scope of the invention as defined in the appended claims.

What is claimed is:

1. An electric machine comprising:
   a stator;
   a cooling jacket having a wall defining a hollow interior and having an inlet opening and an outlet opening for facilitating a flow of coolant through said interior;
   said cooling jacket being positioned on said stator so as to be in contact engagement therewith;
   said wall having an outer wall surface;
   said cooling jacket having a hose-like or sack-like configuration and being made of a flexible, elastic material so as to cause said cooling jacket to lie with said outer wall surface in close intimate contact with said stator to facilitate a transfer of heat from said stator through said outer wall surface and said wall to said coolant;
   an external cooling circulating system connected to said inlet and outlet openings for moving coolant through said cooling jacket;
   said stator having a lamination stack with windings mounted thereon and said windings having end turns which project laterally from said lamination stack;
   an inflexible supporting housing disposed in spaced relationship to said stator;
   said cooling jacket being interposed between said stator and said housing; and,
   said housing having a U-shaped section when viewed in section and the legs of said U-shaped section holding portions of said cooling jacket against said end turns.

2. The electric machine of claim 1, said cooling jacket being made of rubber or silicone.

3. The electric machine of claim 2, said wall being reinforced so as to be stable with respect to pressure.

4. The electric machine of claim 2, further comprising: a condenser system connected to said inlet and outlet openings.

5. The electric machine of claim 4, said condenser system including a pump and a condenser connected in series with said cooling jacket.

6. The electric machine of claim 1, said interior being a clear interior devoid of any structure between wall portions of said cooling jacket.

7. The electric machine of claim 1, said cooling jacket being disposed tightly packed between said inflexible supporting housing and said stator.

8. The electric machine of claim 1, comprising:
   said stator having a peripherally exposed surface extending over 360°;
   said wall having an outer wall surface and said cooling jacket being configured so as to be elongated and having first and second longitudinal ends; and,
   said cooling jacket being mounted on said stator so as to extend over said peripherally exposed surface so as to cause said longitudinal ends to be mutually adjacent.

9. The electric machine of claim 8, said first and second longitudinal ends being in mutually abutting contact engagement with each other.

* * * * *